(12) United States Patent
Naslund et al.

(10) Patent No.: US 8,578,506 B2
(45) Date of Patent: Nov. 5, 2013

(54) DIGITAL RIGHTS MANAGEMENT IN USER-CONTROLLED ENVIRONMENT

(75) Inventors: Mats Naslund, Bromma (SE); Tereza Cristina Melo de Brito Carvalho, SãPaulo (BR); Diego Sanchez Gallo, São Paulo (BR); Makan Pourzandi, Montreal (CA); Marcos Antonio Simplicio Junior, São Paulo (BR); Yeda Regina Venturini, Votorantin-SP (BR)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 176 days.

(21) Appl. No.: 13/122,687

(22) PCT Filed: Oct. 6, 2008

(86) PCT No.: PCT/SE2008/051131
§ 371 (c)(1),
(2), (4) Date: Apr. 5, 2011

(87) PCT Pub. No.: WO2010/041991
PCT Pub. Date: Apr. 15, 2010

(65) Prior Publication Data
US 2011/0191859 A1    Aug. 4, 2011

(51) Int. Cl.
*G06F 21/24*    (2006.01)
(52) U.S. Cl.
USPC ...... 726/27; 726/4; 726/9; 713/156; 713/170; 713/176
(58) Field of Classification Search
USPC .......................................................... 726/27
See application file for complete search history.

(56) References Cited

U.S. PATENT DOCUMENTS 6,115,741 A  *  9/2000  Domenikos et al. .......... 709/217
6,182,122 B1 *  1/2001  Berstis ........................... 709/217
(Continued)

FOREIGN PATENT DOCUMENTS

| WO | 01/95175 A2 | 12/2001 |
| WO | 2006/107185 A1 | 10/2006 |
| WO | 2006/127359 A2 | 11/2006 |

(Continued)

OTHER PUBLICATIONS

Author Unknown. "Marlin Architecture Overview." 2006-2007. Available at: http://www.marlin-community.com/public/Marlin ArchitectureOverview.pdf.

(Continued)

*Primary Examiner* — Kambiz Zand
*Assistant Examiner* — Yonas Bayou
(74) *Attorney, Agent, or Firm* — Coats & Bennett, P.L.L.C.

(57) ABSTRACT

A method of controlling access to content comprises receiving, at a domain gateway (3) of a domain (4), a request from a device (5) in the domain for access to the content. It is determined at the domain gateway whether the number of devices in the domain currently accessing the content is equal to a specified maximum number of devices that may simultaneously access the content. The maximum number of devices that may simultaneously access the content is independent of the number of devices in the domain. If the determination is that the number of devices in the domain currently accessing the content is less than the specified maximum number the request is allowed, otherwise it is refused.

43 Claims, 7 Drawing Sheets

DRM Reference Model for IPTV Environment (Correct to domain gateway)

(56) References Cited

U.S. PATENT DOCUMENTS

| | | | |
|---|---|---|---|
| 7,940,935 B2* | 5/2011 | Nakahara et al. | 380/278 |
| 8,166,301 B2* | 4/2012 | Cam-Winget et al. | 713/171 |
| 8,234,217 B2* | 7/2012 | Derrenberger | 705/51 |
| 8,234,714 B2* | 7/2012 | Naito | 726/27 |
| 2003/0112977 A1* | 6/2003 | Ray et al. | 380/270 |
| 2004/0093523 A1* | 5/2004 | Matsuzaki et al. | 713/201 |
| 2004/0221044 A1* | 11/2004 | Rosenbloom et al. | 709/227 |
| 2006/0129818 A1* | 6/2006 | Kim et al. | 713/171 |
| 2007/0174624 A1 | 7/2007 | Wolosewicz et al. | |
| 2008/0028207 A1* | 1/2008 | Bolcer et al. | 713/156 |
| 2008/0196109 A1* | 8/2008 | Matsuzaki et al. | 726/29 |
| 2008/0275991 A1* | 11/2008 | Matsuzaki et al. | 709/225 |

FOREIGN PATENT DOCUMENTS

| | | |
|---|---|---|
| WO | 2008/000639 A2 | 1/2008 |

OTHER PUBLICATIONS

Open Mobile Alliance. "DRM Architecture." Approved Version 2.0, Mar. 3, 2006. Available at: http://www.openmobilealliance.org/technical/release_program/docs/DRM/V2_0-20060303-A/OMA-AD-DRM-V2_0-20060303-A.pdf.

Kamperman, F. L. A. J. et al. "Marlin Common Domain—Authorized Domains in Marlin Technology." 4th IEEE Consumer Communications and Networking Conference (CCNC 2007), 2007.

Kalman, G. et al. "Right Management Infrastructure for Home Content." 16th IST Mobile and Wireless Communications Summit, 2007.

* cited by examiner

Figure 1 - DRM Reference Model for IPTV Environment (Correct to domain gateway)

Figure 2 - Domain managed by a Domain Gateway

Figure 3 - Home Domain Gateway Modules.

Figure 4 - Licenses structure

DIGITAL RIGHTS MANAGEMENT IN USER-CONTROLLED ENVIRONMENT

TECHNICAL FIELD

The present invention relates to the control of distribution of content to users, for example in a situation in which a plurality of users are potentially able to access the content but the content provider wishes to enforce a limit on the number of users who are able simultaneously to access the content.

BACKGROUND

Internet Protocol Television (IPTV) is a video service offered by a service provider that controls the network infrastructure and content distribution to its customers. Usually, IPTV services run over a multiservice IP infrastructure, which provides data, voice and video on the same infrastructure.

IPTV is seen as a technology having huge business potential. However, to be able to distribute high quality digital content over "open" technology such as IP calls for strong protection of the interests of content owners so that they can be guaranteed a reasonable payment for their supplied content and do not end up handing out content "for free" owing to unauthorised copying, etc. This has lead to the development of systems of Digital Rights Management (DRM) that are intended to restrict in some way how supplied content may be used. However, users are generally not very fond of DRM and thus a solution that is secure from content owners point of view, as well as being convenient and "fair" from users' point of view is essential.

Traditionally, DRM has been tied to the specific device receiving the content and it has been difficult to allow sharing of content across devices. However, users are accustomed to share content across devices, from the time content distribution was made by physical means such as CDs and tapes. Therefore, a need has been identified for a DRM concept based on domains wherein content can be shared.

In general, a DRM system would satisfy all or most of the following requirements:
  Content must be packaged for protection during transmission or storage; this is usually accomplished by encryption.
  It must be possible for users to freely store or backup protected content (usually encrypted as explained above). However, the system must prevent unauthorized content usage, in accordance with purchase terms between the content owner and the user, which terms may, for example, forbid free distribution of the content.
  The system must be independent of media transport mechanism (i.e. UDP, RTP, etc.), distribution service (i.e. broadcast, video-on-demand, etc.), and it must support any kind of content (i.e. audio, video).
  The distribution of content to users should be independent of distribution of the content's license/key to the user. It should be possible to manage contents and licenses separately in the client application.
  DRM control on the end-to-end media distribution must be possible.
  The system must be independent of platform and device type.

Examples of DRM systems have been proposed by the Open Mobile Alliance (OMA) in "OMA DRM Architecture, Approved version 2.0", March, 2006 and by the Marlin project in "Marlin Architecture Overview". OMA and Marlin are generic DRM solutions.

The Marlin and OMA DRM systems are based on domains, which allow content sharing between devices and/or users within the domain. This feature is very important for IPTV environment where the content must be shared between family members/devices and, possibly, temporary guests. The domain concept is slightly different for each system, as is the Service Distribution Provider (SDP) control on the formation of the domain. This feature could limit either the possible fair usage of the content or the user privacy, as discussed below. Another aspect is how the SDP controls the content sharing inside the domains and between domains. This is necessary for copyright control by the SDP, regarding the security policy in the corresponding license.

In OMA, licenses are issued for domains, and distributed to devices through a domain shared key. Then, any device in the domain is authorized to use the content supplied under a license to a domain. The SDP is the domain manager in OMA. The user must request device registration in the domain for content usage. This allows the SDP to control the maximum number and types of devices in a domain. On the other hand, the SDP then knows about the user devices, the specific content used and, depending on the IPTV solution used, the private user data, thus potentially violating user privacy.

Thus, in OMA, domain management is not under the control of the user which could be an obstacle for widespread user acceptance, e.g. inflexibility and inconvenience as well as possible loss of user privacy may be an issue. For example, buying a new device and making it part of the "home" domain may be a complicated operation and a user may not want to tell the SDP which devices he has in his possession.

Marlin DRM is more flexible, and it seems to satisfy basic IPTV scenarios.

The domain can in some use-cases be managed by users, thus avoiding violation of user privacy. Any device in the domain can use the content. However, Marlin is also more complex than OMA. The SDP controls the content sharing through the domain policy in the license, which is issued for users. The domain policy can limit the number of domains with which a user can be associated, and can limit the number of devices by domain. Therefore, the SDP control on media sharing can constrain the user freedom for content usage in the intended IPTV scenarios. For example, a license may contain the policy "this content can only be played if the owner is associated to a maximum of X domains; and the domain, which the license is shared for, has a maximum of Y devices.".

Marlin gives the user more control, but the service provider still has strong control on domain formation, when it defines, in the license, the maximum number of devices that a domain may have. This implies a restriction in users' freedom.

SUMMARY

A first aspect of the invention provides a method of controlling access to content. The method comprises receiving, at a domain gateway of a domain, a request from a device in the domain for access to the content. It is determined at the domain gateway whether the number of devices in the domain currently accessing the content, or the number of devices of a particular type in the domain currently accessing the content, is equal to a specified maximum number of devices. The maximum number of devices that may simultaneously access the content is independent of the number of devices in the domain. If the determination is that the number of devices in the domain currently accessing the content, or the number of devices of a particular type in the domain currently accessing the content, is less than the specified maximum number the request is allowed, otherwise it is refused.

This first aspect of the invention allows content policy to be controlled by a service provider, while the devices in a domain are controlled by users of the domain. This provides a user-managed domain with no constraints on the devices in a domain imposed by the SOP. The user is free to create a domain, and to arrange for devices to join/leave the domain. The copyright control by the SDP is through the security policy in a license, but the policy limits the simultaneous content usage, by specifying a maximum number of devices that may simultaneously access the content, instead of restricting the number of devices in a domain. The first aspect of the invention is simple to implement and, in particular, is much simpler that the Marlin prior art mentioned above.

The first aspect of the invention may be used to control the overall number of devices in the domain accessing content at one time, to ensure that it never exceeds a maximum, for example specified in a license. Additionally, it may be used to control the number of devices of a particular type that are accessing content at one time.

A second aspect of the invention provides a method of controlling access to content. In this method, a domain gateway receives a license for content. The license specifies a maximum number of devices of the domain that may simultaneously access the content, and the maximum number of devices of the domain that may simultaneously access the content is independent of the number of devices in the domain. This aspect of the invention again allows content policy to be controlled by a service provider, while the devices in a domain are controlled by the domain users.

A third aspect of the invention provides a method of controlling access to content. The method comprises providing a domain gateway of a domain with a license for content which specifies a maximum number of devices of the domain that may simultaneously access the content. The maximum number being independent of the number of devices in the domain. This aspect corresponds to the second aspect, but relates to steps carried out by a service provider rather than by a domain gateway.

In the second or third aspects, as well as specifying an overall maximum number of devices of the domain that may simultaneously access the content, the license may also specify, for two or more device types, limits on numbers of each device type that may simultaneously access the content.

A fourth aspect of the invention provides a gateway for controlling access to content. The gateway is adapted to: receive a request from a device in a domain associated with the gateway for access to the content, and determine whether the number of devices in the domain currently accessing the content, or the number of devices of a particular type in the domain currently accessing the content, is less than or equal to a specified maximum number which is independent of the number of devices in the domain. If the determination is that the number of devices in the domain currently accessing the content, or the number of devices of a particular type in the domain currently accessing the content, is less than the specified maximum number the request is allowed, but otherwise the request is refused.

A fifth aspect of the invention provides a gateway for controlling access to content. The gateway can store a license for accessing content which specifies a maximum number of devices of a domain associated with the gateway that may simultaneously access the content. The maximum number of devices of the domain that may simultaneously access the content is independent of the number of devices in the domain. The gateway also has means for monitoring the number of devices in the domain accessing the content.

Though the background of the invention above is described only in the context of IPTV, it is easily seen by one of skill in the art that the invention is equally applicable to distribution of other forms of content such as movies, music, general forms of audio, text, computer games or software, etc.

Other features of the invention are set out in the dependent claims.

BRIEF DESCRIPTION OF THE DRAWINGS

Preferred embodiments of the present invention will now be described with reference to the accompanying drawings, in which.

DETAILED DESCRIPTION

The present invention is based on a "(home) domain gateway" concept. All content, and all licenses, must pass through this gateway before any device of the domain can make use of (or "render") the content.

The content provider and/or a service delivery provider (eg an IPTV network operator) that delivers content to the subscriber can define how many devices in a domain may play the content simultaneously, according to the terms of the license granted to the domain. The domain gateway enforces this restriction on the devices of the domain. However, the content provider or service delivery provider does not place any limit on how many devices there may be in a domain. As a result, an end-user has (almost) total privacy relative to the content provider and the service delivery provider regarding the "topology" of the domain and which particular devices of the domain they use. However, the content provider and service delivery provider may feel safe from unauthorised use of their content.

This allows a more flexible business and usage model for service provider and end-users.

A further feature of the invention is that it allows users to define additional local constraints on the content use inside the domain, in addition to the restrictions imposed by the license. For example, in a domain in a home, parents may block certain content for a TV set in a child's room. As another example, in a hotel, the owner could constraint premium channels/VoD/PPV for the TV set in a standard room while permitting these services for another TV set in a deluxe room.

Figure 1:
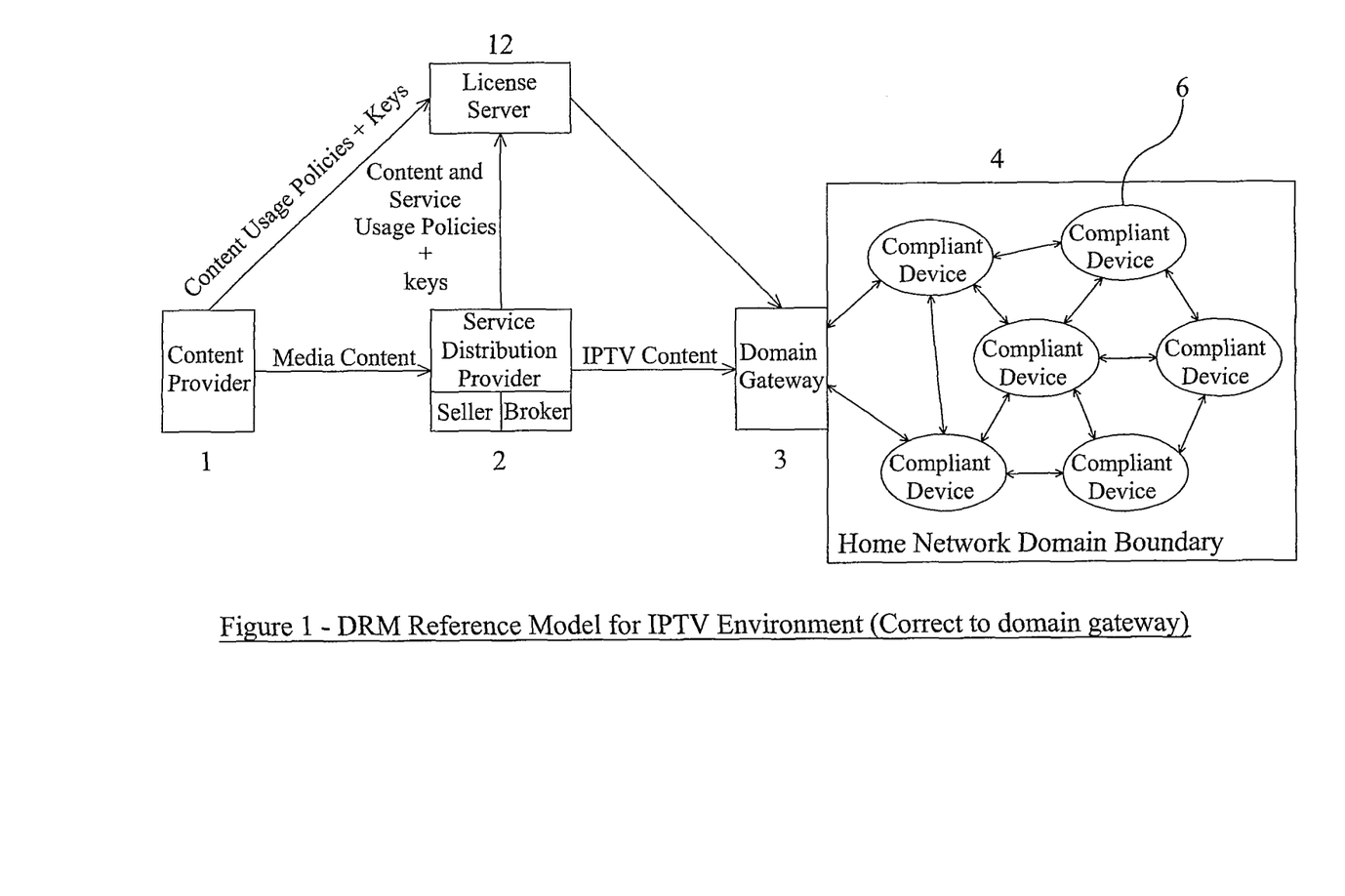
FIG. 1 is a schematic block diagram illustrating a method of the invention.

FIG. 1 is a block diagram showing the main components of a DRM system of the invention. The Content Provider (CP) 1 is the owner of the content that is to be licensed to an end-user and is the owner of the digital rights in the content, and requires that the digital rights in the content must be assured.

The content is distributed from the CP 1 by a Service Distribution Provider (SDP) 2, for example an IPTV SDP. The CP "trusts" the SDP, which is responsible for some functionalities of the basic DRM: for example, media packaging, license service, key and content distribution. The CP and SDP may be distinct entities, or they may be two parts of the same entity.

The Domain Gateway 3 connects a home network or "domain" 4, which in general is located in premises of a customer, to the transport network, which is also connected to the SDP. IPTV services are distributed to devices 5 in the domain 4 by the Domain Gateway 3. (The devices 5 in the domain are labelled as "compliant devices" in FIG. 1, for reasons that are explained below.)

The concept of a "domain gateway" is known in the prior art (e.g. akin to a "Digital TV set-top box"), and will be familiar to one of ordinary skill in the art. According to the invention, however, the domain gateway 4 is provided with novel functionality, to allow it to provide a DRM of the invention.

All content (and licenses) directed to the domain 4 must pass through the domain gateway 3. (To be precise, content that does not pass the DG will only be available in encrypted form, and a content decryption key/license must be retrieved from the DG in order to render it.) The content provider can authenticate and verify the presence of the DG before sending any content to it. While there is no direct trust relationship between the CP 1 and the user of the domain 4, the CP 1 may trust SDP 2 which in turn has a relationship based on a shared security with DG 3.

The DG 3 is associated with one (or more) Subscription ID (SID). Behind each subscription there is an associated subscriber. An SID thus identifies the subscriber behind that subscription, and the term SID may also be referred to as "subscriber ID". The SID could be in "soft" form, e.g. a certificate or "hard", e.g. *SIM card. This is the basis for needed security functions such as authentication and charging. It should be understood that the term subscriber relates to the entity which has a business agreement with the SDP in form of a subscription to, in this example, IPTV services. The agreement defines which services/channels that are part of the subscription, pricing, etc. Most often the subscription will be tied to a physical person (e.g. one of the parents in a household). However, there may simultaneously be a plurality of end-users utilizing the subscription, (e.g. other family members or guests). Alternatively, the subscriber could be an enterprise or business providing IPTV service to others. The SID therefore identifies the subscription (e.g. for charging/billing purposes) but not necessarily the individual users who use content provided under the subscription. In the following description, we may sometimes simplify description by using the term "user", rather than referring to the (set of) user(s) associated with a certain subscription.

The DG 3 has a trusted environment that acts as an "agent" on behalf of the content provider 1, making sure the license rules under which the CP 1 makes the content available are enforced. The DG will authenticate devices in the home domain and only distribute content to "compliant devices" (e.g. devices that have copy protection) and only according to the license/policy imposed by the CP 1. In particular, the invention contemplates that the CP 1 will impose a limit on the maximum number of devices in the domain 4 that may simultaneously access content and the DG 3 will make sure that, regardless of the number of devices in the domain 4, only the prescribed maximum number of devices will have simultaneous access to the content at any given time. This gives full flexibility for users to add as many (compliant) devices 5 as they like to domain 4 and yet, since the DG 3 ensures that only the prescribed maximum number of devices will have simultaneous access to the content, the content provider 1 does not need to know which specific devices of the domain 4 are accessing the content at any time. This provides maximum user privacy, while still providing effective DRM protection for the content. (The process of adding a new device is a simple "pairing" process between device and DG, and is described in more detail below. It is performed by a domain manager, for example a user with enhanced rights (a "super user"). This contrasts with the aforementioned OMA DRM solution where users cannot add devices to the domain without involving the SDP. It also differs significantly from the Marlin concept, where the limitation is set on the number of devices in the domain rather than on the number of devices simultaneously having access to the content.

A more detailed description of the components of the invention will now be given.

A domain is, for the purposes of this invention, a subset of fixed or portable devices that may share the same content license and policies (subject to possible further user-defined restrictions as described below). Licenses for content access are issued in accordance with the agreement in an associated subscription, e.g. licenses are issued granting access to those channel(s) which are included in the subscription. The domain 4 gets access to services, for example IPTV services, through the Domain Gateway (DG) 3, which is connected to the SDP network. The domain is associated with a subscription/SID. The DG uses the SID, acquired when the subscription with the SDP was set up, to authenticate the subscription with the SDP, providing access to the licensed content to the domain according to the terms of the subscription and to SDP policy. A domain may, for example, contain devices in the home of a user and guests, or a subset thereof. Note that the domain is not known to the SDP, only the subscription and DG is.

In this application, a "user" of the domain 4 is a person who is permitted to use one or more of the devices in a domain 4. In an example where the domain 4 is in a residential house, every occupant of the house may be a potential user of a device in the domain. (The number of possible users may be less than, equal to, or more than, the number of devices in the domain.)

In practice, one of the users is likely to have administrator privileges (enhanced rights) so that he/she can act as domain administrator or "domain manager", for example adding/removing devices from the domain.

As noted, a "subscriber" is an entity (typically a person or group of persons) who has subscribed to the SDP 2 for the delivery of content to the domain 4. In general, a subscriber will be one of the users of the domain.

The following description of the invention will assume that there is one subscriber, who has taken out one subscription with one SDP. In general however, the invention is not limited to this, and in general a domain gateway may manage two or more domains to allow content sharing among subscribers and devices. Any device paired with the domain gateway (thereby forming a domain) can access contents of one or more domains managed by the domain gateway within the terms of the subscriptions (but possibly subject to restrictions set by the domain manager as described below). For example, one user of the domain may subscribe to a first SDP for a first content (eg music) and another user of other domain may subscribe to a second SDP for a second content (eg films). There are thus two subscriptions/STDs handled by the same DG. The DG may also authenticate itself towards the SDP as discussed below.

Note than when the DG handles more than one domain it may be necessary to separate the role of "domain administrator/manager" from that of "DG administrator/manager". In a typical example, the domain administrator/manager would be authorized to manage (add/remove) devices within the associated domain, whereas creation of a completely new domain would be a task for the DG administrator/manager. The different roles could be verified/authenticated by use of e.g. separate passwords/user names.

The subscription allows the user to access (or "render") the content in domain 4, but this access is subject to conditions relating to the permissible use of the content, in particular on copying of the content. These restrictions are typically imposed by the SDP (for example the SDP may offer a cheap subscription that has more restrictions on permissible use of accessed content and a more expensive subscription that is less restricted). In principle, however, the CP may also or alternatively seek to impose conditions on the user—for example, the CP may classify some content as "adult only" and seek to prohibit children from accessing such content. The content usage policies are passed to a license server (LS) 12 which generates a suitable license to be supplied to the DG 3. FIG. 1 shows both the CP 1 and the SDP 2 as sending content usage policies to the LS 12—FIG. 1 illustrate an example in which it is possible for the CP and/or SDP to define content policies, for the SDP to define service policies, and for the CP or SDP to define a content key (depending on which is responsible for content encryption). In principle, as already noted, the LS may receive content usage policies from only one of the CP and SDP.

In order to provide privacy, domain management is performed by the subscriber/users and information such as the domain composition (e.g. the number and types of devices in the domain) is never disclosed to the SDP 2 or the CP 1. The enforcement of policies relating to the permissible use of the content provided by the SDP is executed by the DG 3. The policies set by the CP and/or the SDP relating to the permissible use of the content cannot be overruled by the domain management, the subscriber or the users. (However, the domain management, subscriber and/or users may further restrict what is considered permissible use as will be elaborated later.)

This domain characterization could for instance be in accordance with the security domain defined in ISO/IEC 10181-1:1996.

Figure 2:
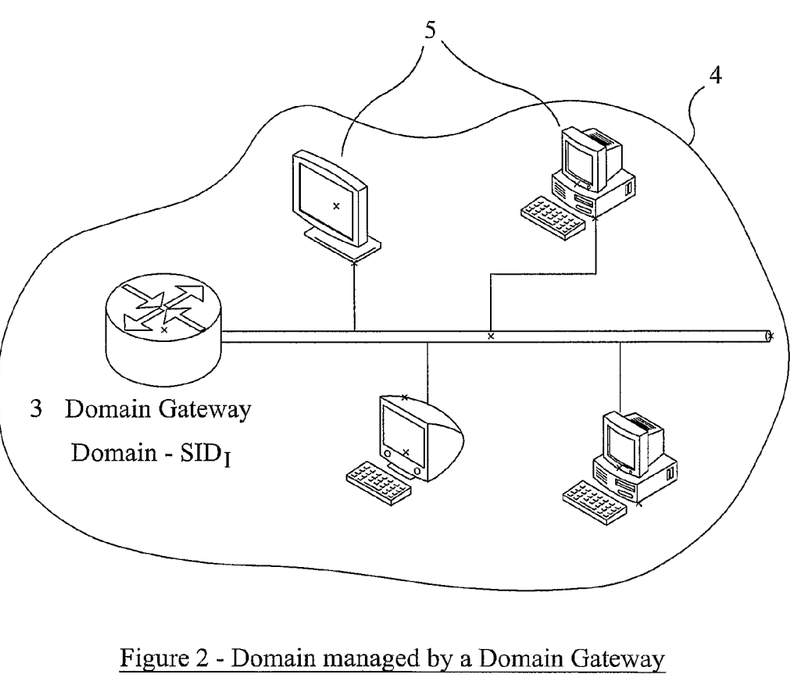
FIG. 2 is a schematic block diagram of a domain.

FIG. 2 shows a domain 4 composed by devices 5 and a DG 3, which receives the content for distribution to devices 5 inside the domain and which also receives licenses defining the permissible use of the content. Although only one domain 4 is shown in FIG. 2 for clarity, one DG 3 can in principle manage several domains at the same time, and in one embodiment one DG 3 can also handle several SIDs.

The following description will assume that devices 5 in the domain 4 comply with copy protection needs.

Figure 3:
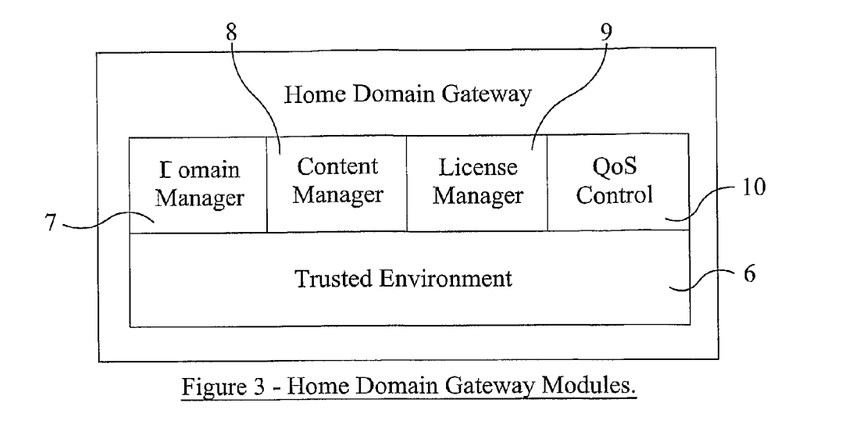
FIG. 3 is a schematic diagram of a domain gateway suitable for use in the present invention.

FIG. 3 is a schematic block diagram of the domain gateway 3 of the domain 4. The DG 3 includes a trusted environment 6, a domain manager module 7, a content manager module 8, a license manager module 9, and a QoS (Quality of Service) module 10. The Domain Gateway 3 acts as the entry to domain 4 since any RSO (Right and Service Objects) or IPTV content must pass first through this gateway. The principal function of the gateway is to provide home network services for devices in the domain, such as connection to an exterior network, domain management, domain content management, domain license management and QoS control.

The Trusted Environment 6 allows the Domain Gateway (DG) 3 applications to run (with reduced security vulnerabilities) in a trusted manner—that is, trusted by the party or parties who have imposed restrictions on the permissible use of content—since these applications perform security-sensitive operations (eg, the SDP and/or the CP). This trusted environment acts as an agent for the content provider and/or SDP and is the basis of enforcing the content policies. This part could for instance be TCG/TPM based (Trusted Computing Group/Trusted Platform Module).

Figure 6:
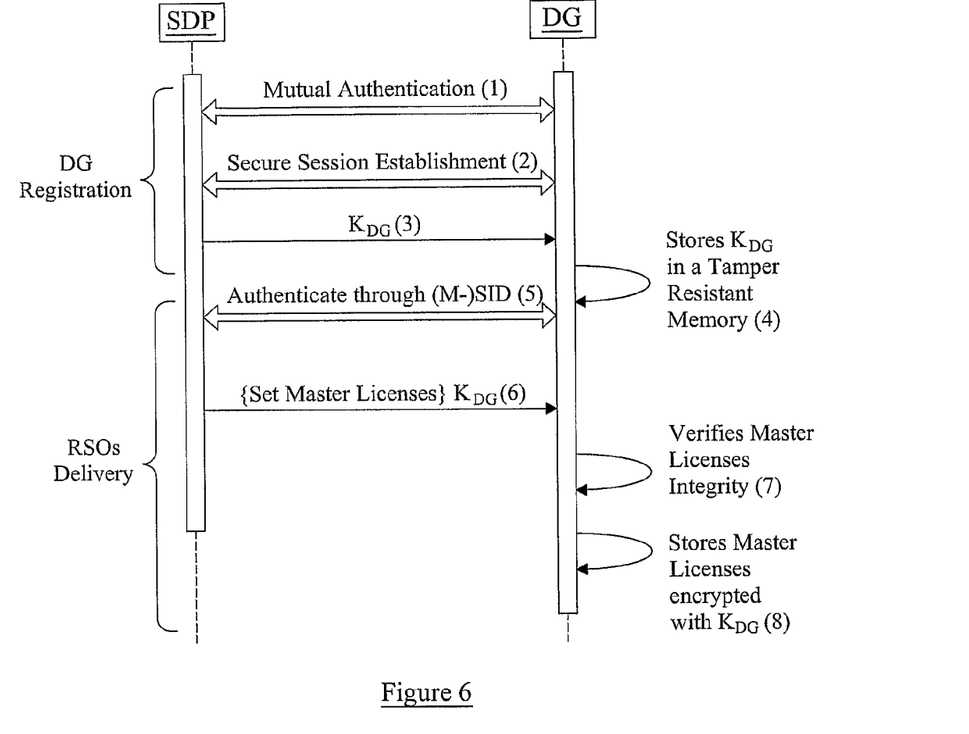
FIG. 6 is a schematic diagram showing the steps of setting up a license with a domain gateway.

A domain 4 may be created by a DG 3 after the SDP 2 registers the Domain Gateway 3 as trustworthy (registration of a DG is described in more detail below with respect to FIG. 6). After that, a domain manager, who may for example be a user of the domain who is provided with privileged user rights, can register and remove new compliant devices in a domain. Compliant Device registration requires two operations: compliance checking and device authorization. Compliance checking is the process in which the Domain Gateway 3 checks with the SDP whether that model of device is compliant (ie, is not counterfeit) for the SDP. Device authorization is the process in which a given compliant device 5 is authorized in a given domain 4. A device only can be registered in a given domain 4 if there is connectivity with the Domain Gateway 3 of that domain. Compliant devices can also leave a domain, either voluntarily or forcefully (for example if damaged or stolen). (Compliance device registration is described in more detail below with respect to FIG. 7.)

The domain manager's desired policy is enforced by a Domain Manager process or domain manager module 7 running in the DG 3. The distinction between the Domain Manager user (a person) and the Domain Manager module/process 7 of the DG should be appreciated.

The Domain Manager module/process 7 also enforces authentication of the Domain Manager user, before accepting any changes in domains' policy/formation from the Domain Manager user.

The Content Manager module 8 brings IPTV content into the domain 4 by interacting with one or more SDPs, and distributes the IPTV content to the compliant devices 5 of the domain. The Content Manager module 8 performs this task independently of the transport mechanism—inside the domain 4, the IPTV content can be distributed using any transport/network mechanism (e.g. LAN, Bluetooth, cable, IR, etc). Inside the domain 4, only the Protected channels will be protected (at application level), since the service-related protection exists only until the content is delivered to the Domain Gateway. Within the domain 4, service-related policies are enforced by the DG 3 via the License Manager module 9 of the DG 3.

Figure 4:
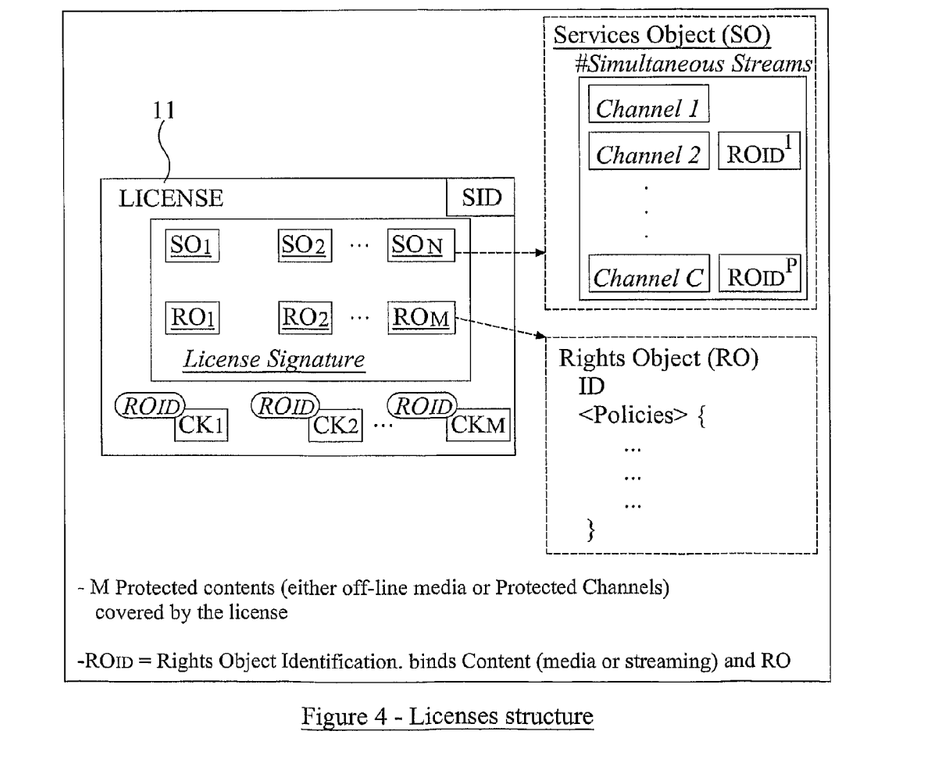
FIG. 4 is a schematic diagram of a license suitable for use in the present invention.

The License Manager module 9 receives "Rights and Services Objects" (RSOs) from the License Server (LS) 12 of FIG. 1. Each RSO contains services objects and associated rights objects, as explained in FIG. 4. After it receives a RSO, the domain manager module 7 analyzes it, in a manner that all service policies (non DRM-specific) are enforced by the Domain Gateway (by License Manager module 9 or by QoS Control module 10).

The remaining policies (content usage policies) are delivered to the domain compliant devices. These policies dictate content usage rules and may cover almost any aspect of use of the content such as, for example how many times the content can be rendered, at what resolution the content can be rendered, a time period during which the content can (or cannot) be rendered, whether certain users (adult/child) should be able to access the content, etc.

It should be noted that although content usage policies relating to, for example, how many simultaneous copies of the content may be made are binding on the users, content usage policies relating to, for example, the suggested minimum age of a user who can access particular content need not be binding on the users—the CP or SDP may provide a default profile (policy) for a particular content type, but this can be overwritten by the DG administrator if desired. The DG administrator may adopt a policy that is more restrictive than the default policy from the SDP or CP, or may adopt a policy that is less restrictive than the default policy from the SDP or CP.

Where a policy relating to, for example, the suggested minimum age of a user who can access particular content is enforced by the DG administrator, the license for that content is sent to a compliant device in the domain only if the user of the device is authorized to access that type of content. This enforcement is performed by the DG, by comparing the profile (policy) adopted for the content with a profile of the user.

The QoS Control module 10 assures that a required or contracted-for QoS is provided. The QoS module 10 may be a conventional QoS module, and its detailed description is not relevant to the invention.

Subscription

The commercial relation between an SDP 2 and a user results in a subscription (and results in the domain "user" becoming a "subscriber"). As discussed above, a subscriber does not need to be a physical person, it could also be e.g. an enterprise/business. Without loss of generality, we will however assume the subscriber is a person in the following description.

A domain user is a subscriber of a SDP if he/she has a subscription for that SDP for the delivery of content. A subscription gives the subscriber the right to use a set of services provided by that SDP, for example to access specified content. Some of these services are included in the subscription without additional cost, such as some TV channels; others may demand an additional fee by use, such as a pay-per-view service.

A subscription is associated with one or more Subscriber Identities (SID). An SID identifies the subscription, and hence identifies the subscriber. The subscriber uses these SIDs during authentication. Whether a subscription has one or more associated SIDs depends on the SDP business model. For example, the SDP may provide distinct services for home and foreign access—in this case, the SDP may allot two SIDs for one subscription, one for home access and one for foreign access, and provide the subscriber with services depending on which SID is provided by the subscriber.

SIDs can be physical or logical objects (e.g., respectively, a smart card or a certificate signed by the SDP with whom the subscriber has taken out the subscription (in practice a user is likely to subscribe with the SDP although in principle the user could subscribe direct with the CP), as long as they are able to identify the subscription in a secure way. There are some advantages and disadvantages involving each of these approaches, but the particular choice of SID is not relevant to the invention.

The DG thus preferably supports handling more than one SID simultaneously. Besides allowing the usage of more than one SDP, this also allows the management of temporary SIDs to achieve user mobility requirements. In both cases, the DG must be able to manage multiple domains, and manage channels from different SIDs. To avoid channel-mapping conflicts, a DG that manages two or more domains may select one domain at any one time to get access, or there may be a mechanism for channel number mapping.

When a user subscribes to an IPTV service from a Service Distribution Provider for the first time, the SDP sets up the DG environment, for example off-line (although off-line setup may be unnecessary if there is a trustworthy manufacturer certificate for authentication and compliant check). This may entail physically delivering hardware to form the DG (e.g. a Set-Top-Box able to run the DG application), or it may involve simply checking the capability of existing hardware, belonging to the subscriber, to verify whether it supports the trusted environment required by the DG application (e.g. checking if a general purpose computer has a TPM (Trusted Platform Module) chip). Thereupon, the SDP installs and configures the DG. The SDP also installs a $DG_{ID}$ in the configured DG, which is stored in its tamper-resistant memory (managed by DG trusted application) and is used to authenticate this DG (alternatively, using a manufacturer's certificate this may be performed during DG registration). Only the SDP can access the DG system area reserved to SDP initial setup, which is required to guarantee that the user does not have access to any protected key. Note that the ID (or credential) of a DG is not to be confused with the SID. The SID identifies a subscription while the $DG_{ID}$ identifies the DG. (A DG could, as mentioned, handle several SIDs and/or domains.)

It should be noted that the SDP needs to verify/authenticate both the subscriber/subscription and the DG. The first authentication is needed e.g. for charging/subscription information retrieval and the second is needed to verify that a trusted DG is used as it is only then that the SDP can know that the DG will enforce content usage policy. Preferably, the two authentications are securely/cryptographically linked to each other. DG authentication is described in the section "Domain Gateway Registration" below.

License Structure

A License is an information/data object that enables access to services and the decryption of contents (either media or streaming) according to the policies defined by the CP and/or the SDP. It is stored in the end-devices (DG 3 and compliant devices 5 in the domain), where the policies are enforced in order to decrypt and render the content. Some aspects of the license are conventional—the license will identify the SID to which the license is issued and the usual content protection keys and usage rules are stored in the license—but, according to the present invention, the license further contains rules concerning the maximum permissible number of simultaneously rendered "copies" of the content. Thus, as shown schematically in FIG. 4, for every services object $SO_1$, $SO_2$ . . . (e.g. IP TV channels or sets of channels) that is licensed to a domain by a license 11, there is an associated rights object $RO_1$, $RO_2$ . . . that defines policies relating to the services object, and in particular defines the maximum permissible number of simultaneously rendered "copies" of the services object. The maximum permissible number of simultaneously rendered "copies" defined in the license may differ from one services object to another. The rights object may also define other restrictions on use of the services object, for example specifying the maximum number of renderings. The rights object may also suggest other restrictions, for example that the object should only be available to users over a certain age, although as described above enforcement of such suggested restrictions is a matter for the domain manager.

Another important point is that the license structure is hierarchical. The DG obtains a master license for the content, from which it can generate sub-licenses, e.g. "play-once" license targeted to a specific device. This is shown in more detail in FIG. 5.

Figure 5:
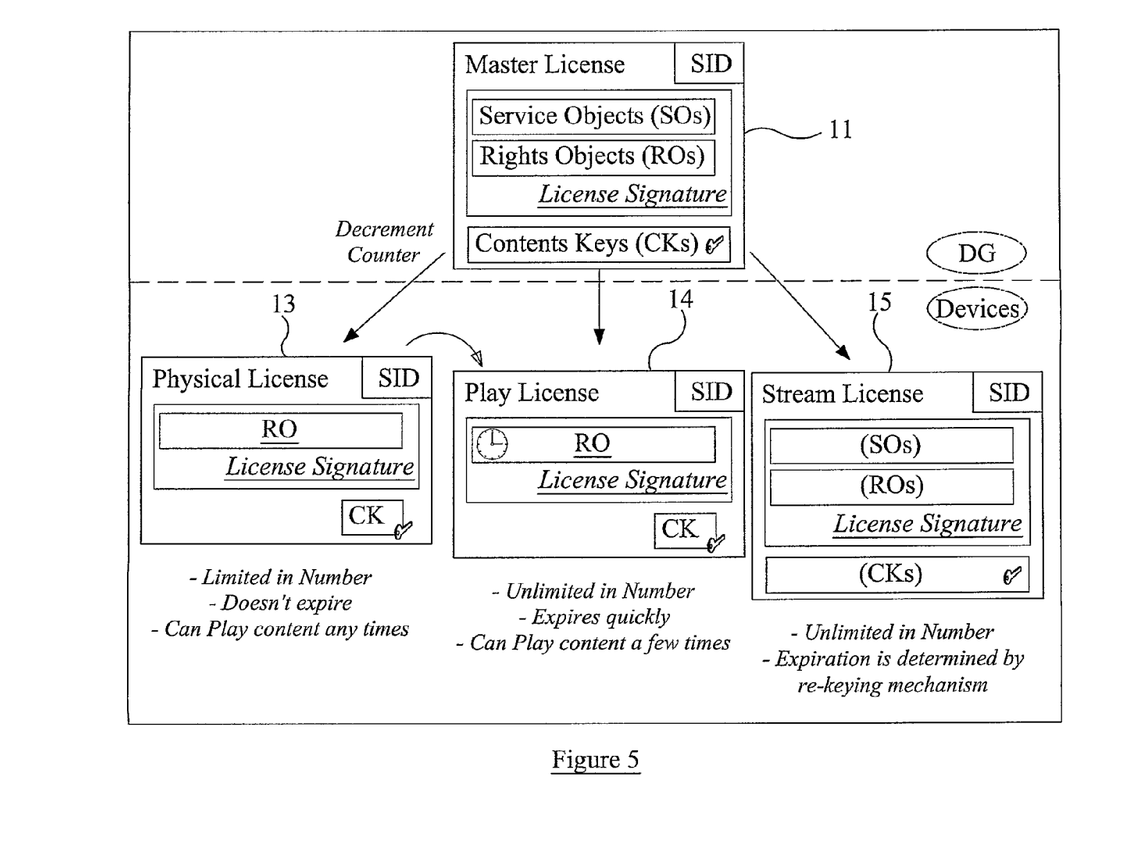
FIG. 5 is a schematic diagram of a license suitable for use in the present invention.

The DG has a master license 11. When a user makes a request for content to be delivered to a device 5 in the domain, the DG grants a sub-license to the device 5, assuming that the maximum number of simultaneously rendered copies of the content specified in the master license has not been reached. The DG maintains a count of how many devices in the domain are currently accessing the content, for example by decrementing a suitable counter by 1 whenever it grants a sub-license to a device in the domain. When the counter reaches "zero", any further requests for that content are refused, as this indicates that the maximum number of simultaneously rendered copies of that content specified in the master license has been reached. When a device finishes accessing the content, the counter is incremented by one. Alternatively, the DG may count the number of devices accessing the content by increasing a counter by 1 as each new device accesses the content, and decreasing it as a device finishes the access; when the counter reaches a pre-set value any further requests for that content are refused.

Note that the DG may itself comprise (parts of) a rendering device. For instance, the DG may comprise a D/A conversion unit that renders the content on an external unit such as a flat-screen device. Since the DG is considered trustworthy, this rendering may or may not be "counted" when maintaining a record of the total number of devices that renders the content.

In one embodiment, the sub-license granted to a device may be one of a "Physical license" 12, a "Play license" 13 or a "Stream license" 14 to that device. When implementing the control of the maximum number of devices simultaneously accessing content as described above, the number of devices simultaneously accessing content is accounted as following for each license type:

Stream licenses are used for real-time content distribution, such as a conventional IPTV channel, for example through multicast group association. A stream license is potentially unlimited in time, but expires when the device ceases to access the content. To access real-time content, a device has to make a request to the DG for a channel access (to join a multicast group). If the number of current devices is less than the allowed number, the DG increments the number of simultaneous stream in use, and then grants the access to the device by issuing a stream license for it. When the device finishes playing that channel (ie, powers-off) or requests another channel access (changes channel) it must inform the DG (and leave its current multicast group and, if changing channels, join a new multicast group), and the DG cancels the stream license. The DG controls the number of simultaneous streams through the stream license issuing and the re-keying mechanism (stream content key exchange). (The key used by the DG for content distribution is different from the key used by the SDP.) The DG performs a re-keying mechanism whenever a device requests access or leaves a channel (joins or leaves a multicast group). When the maximum number of simultaneous streams is reached and the DG receives a further request for a channel, the DG may start a synchronization mechanism, which searches for devices associated to the respective Service Object (which defined the maximum number of simultaneous streams for that channel). If the number of devices currently accessing the channel is found to be less than the maximum number of simultaneous device allowed, the DG considers that one or more devices can have powered-off or gone out-of the communication area without informing the DG, and the DG starts a re-keying mechanism accounting the number of simultaneous stream for devices found to be active. The DG can then grant the access for the most recent requesting device. Since a stream license is cancelled on expiry the DG can issue an unlimited number of "Stream licenses", provided that the number of unexpired stream licenses current at any time does not exceed the number of simultaneous streams allowed by the Service Object.

The "Physical license" 13 and the "Play license" 14 are used for stored/storable content. A "Play license" 14 grants a content key that is never stored in a non-volatile memory, and that allows the content to be played a few times. When the play license expires, the associated content key is removed from the device. A "Play license" 14 could also be called "Play once license". The number of simultaneous content access for a "Play license" 14 is again controlled not to exceed the number allowed by the Service Object, for example by keeping a count of the number of the current Play licenses. The number of current Play licenses is decreased by time (when an issued Play license expires) or when a device informs the license issuer that it has finished playing the content.

A "Physical license" 13 is like a physical CD/DVD. It gives the holder the right to play the content at any time, and is of potentially unlimited term. It is issued by the DG, which then increments the number of simultaneous accesses to the content, independent of whether the content is actually being played by the holder of the "Physical license". A "Physical license"13 can be moved, but never copied. Access to it must be granted only by trusted application in a compliant device, even it is encrypted. A "physical license"13 can be used to issue a "Play license"14 as a sub-sub-license, for example, when a user has a "Physical license" 13 in his/her compliant mobile device (ie., cell phone) and he/she wants to play the content in a friend's device. Each physical license can issue only one play license at any time.

Domain Gateway Registration

After the initial off-line setup, when a user turns on his system for the first time, before it receives any content from the SDP, it is necessary to register the Domain Gateway (DG). This process is shown in FIG. 6.

The DG registration begins with the mutual authentication (step 1) between the SDP and DG with a secure session establishment (step 2) (e.g. using SSL/TLS protocol). The DG receives then a unique key—$K_{DG}$,—from the SDP (step 3) and this is stored in the DG tamper resistant memory (step 4). As mentioned, the SID may need to be cryptographically tied to its use with this DG. This will be achieved e.g. by running the SID authentication inside this SSL/TLS tunnel, see next section.

Service Activation—Master Licenses Delivery

After registration of the DG, the DG may present to the SDP a SID or M-SID (mobile-SID) of a subscriber in order to authenticate the subscriber (step 5). If authentication is successful, the DG then receives (step 6) a set of Master Licenses for the content the subscriber is entitled to access under the terms of their subscription, as set out in the (M-)SID presented at step 5, all of them encrypted with $K_{DG}$. The DG License Manager module 9 verifies (step 7) the Master Licenses' integrity (it verifies that the Master Licenses are signed by (most commonly) the LS authorised by or associated with the SDP) and, if the verification is successful, stores them encrypted (step 8).

The Master Licenses delivery operation of steps 5-8 occurs whenever a subscriber acquires new IPTV Services from an SDP: a new Master License can be issued (with or without revoking the older one) or the existing Master License can be updated in this way. Issuing of new master license is of course preferably subject to authentication and authorization as discussed above.

The maximum number of devices of the domain that may access simultaneously the content is defined by the Master License. This limitation is enforced by the DG 3 whenever a device 5 in the domain 4 requests a new channel.

In the invention, the CP or SDP have no influence over the number of devices 5 in a domain 4, and the number of devices in a domain can be chosen freely by the domain users. The maximum number of devices that may simultaneously access content is set by the SDP and/or the CP, although it is of course necessary that the DG is capable of handling the maximum permitted number of simultaneous devices, since increasing the number of simultaneous content requires a more robust DG hardware capable of scaling, irrespective of the number of devices in the domain. The maximum permitted number of simultaneous devices can be changed by future services purchasing, for example when a subscription is renewed.

Managing Devices in the Domain

Figure 7:
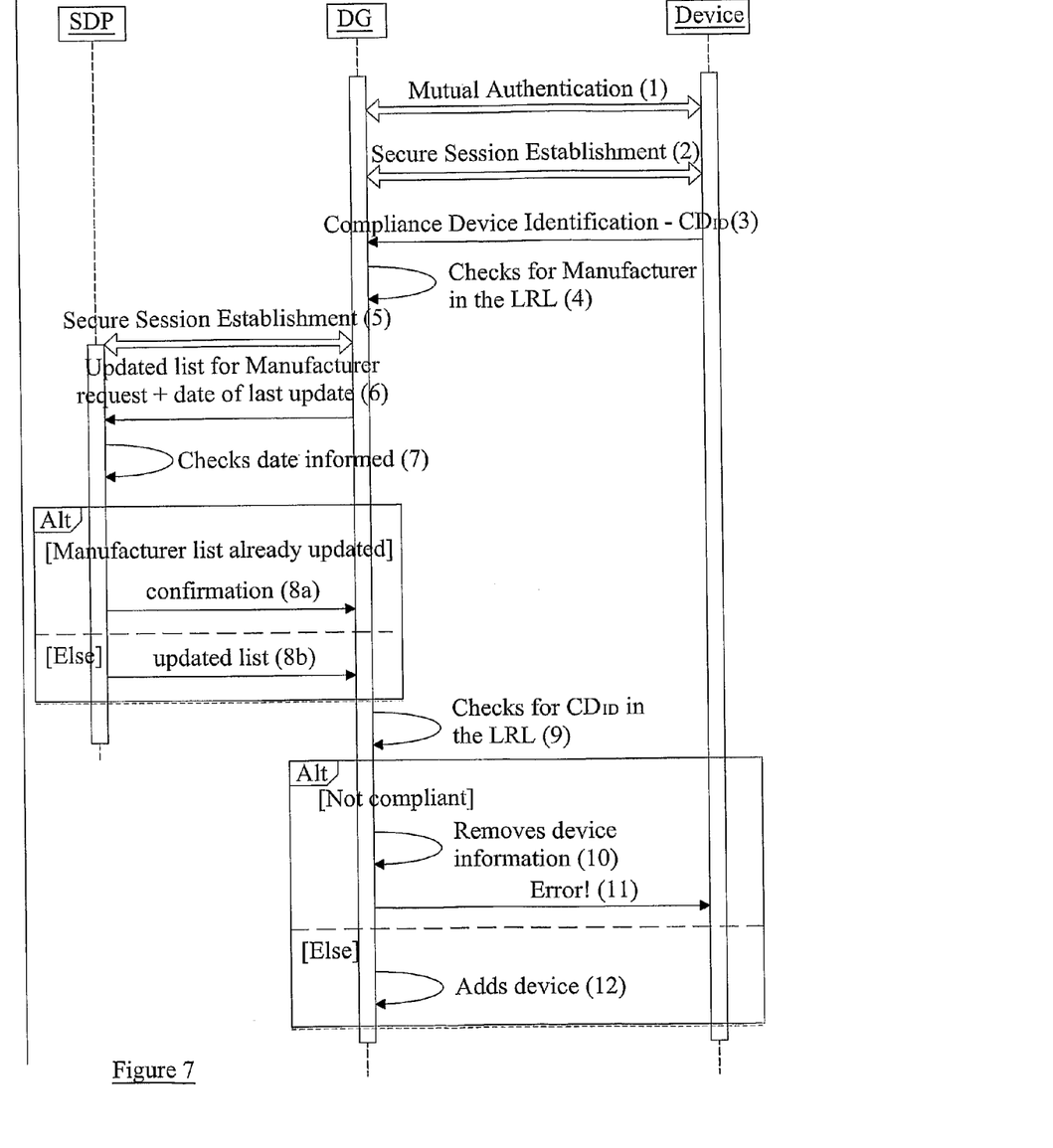
FIG. 7 is a schematic diagram showing the steps of adding a device to a domain.

FIG. 7 shows how a device is joined to a pre-existing domain.

The device registration begins with the mutual authentication (step 1) between the device and DG with a secure session establishment (step 2) (e.g. using SSL/TLS protocol). The device then identifies itself to the DG (step 3).

The DG then determines the "type", usually the manufacturer and model of the device, from the identification of the device (step 4). It also checks the LRL (Local Revocation List), which is a list of IDs of devices that have been "hacked" and should not be permitted in the domain.] The device serial number or other device identifier could also be used.

The DG then establishes a secure session with the SDP (step 5)—details of the authentication process required to establish this secure session have been omitted from FIG. 7.

The DG then requests a manufacturer list from the SDP, with information as to when the list held at the DG was last updated (step 6). The SDP checks when it last received information from the manufacturer (step 7). If this shows that the list held at the DG is current then the SDP advises the DG of this (step 8a), otherwise the SDP sends an updated list to the DG (Step 8b).

The DG then checks whether the device is DRM compliant, for example copy-protection compliant, using either the list that it held (if the SDP has advised the DG that this list is current at step 8a) or using the new list provided at step 8b. If the device is found to be compliant, the DG adds the device to the domain at step 12. If however the device is found not be compliant, the DG removes the device information at step 10 and sends an error message to the device at step 11.

As noted, the DG may itself comprise an internal rendering unit, in which case the secure session establishment with the "device", here being the rendering unit, could be an internal issue of the DG.

As an alternative, if the device is found not be compliant it may still be added to the domain, but with additional restrictions on the content that may be supplied to the device (over and above restrictions defined in the license)—these additional restrictions are typically defined by the SDP but may also be user-imposed, for example may be applied as described in the section "User-added content access restrictions" below.

Accessing a Service

Figure 8:
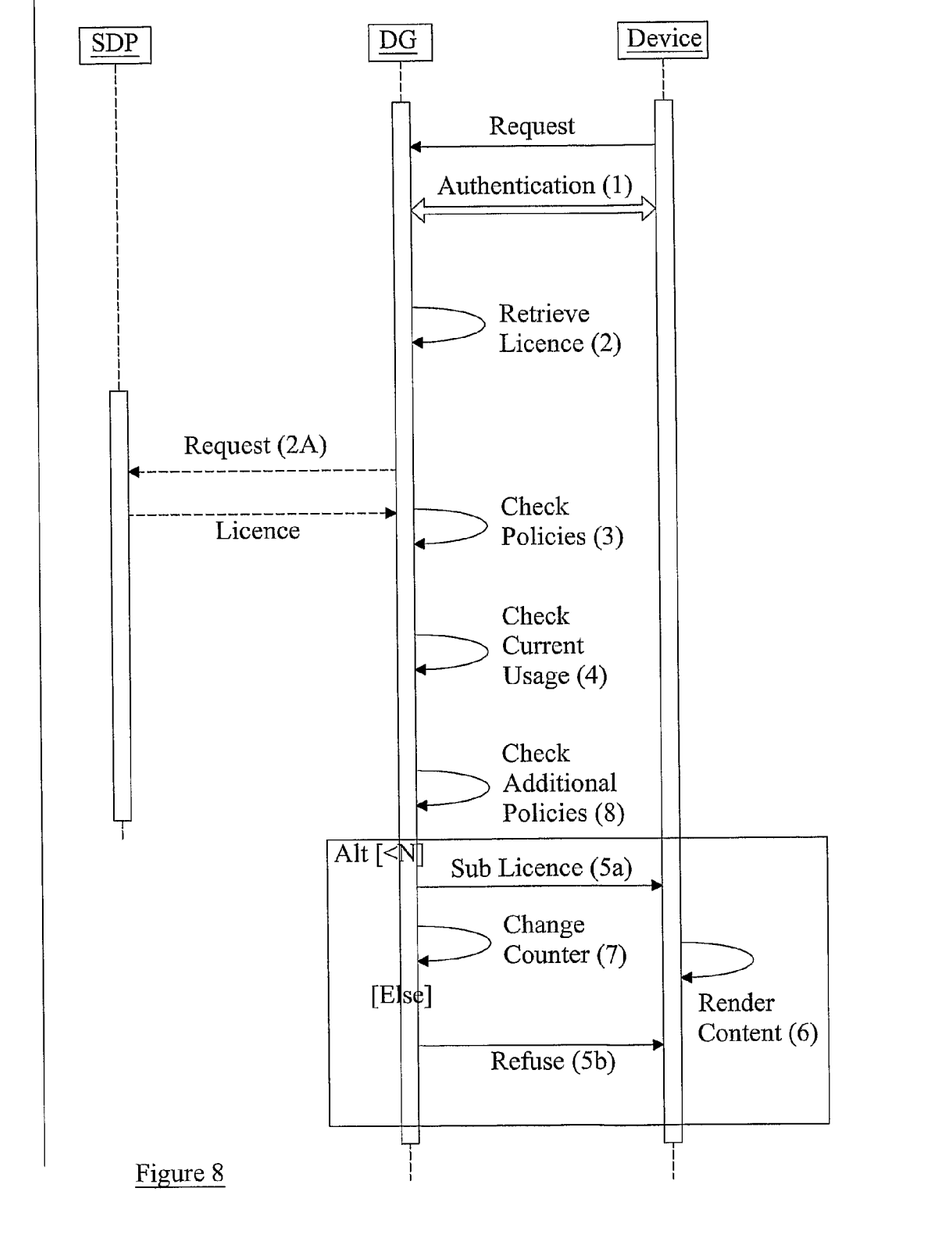
FIG. 8 is a schematic diagram showing the steps of a method according to an embodiment of the invention.

FIG. 8 shows the principal steps of a device 5 in a domain accessing a service.

Step 1: When access to a service (e.g. TV channel or movie) is requested by a device, the DG will first authenticate the device (step 1) to verify that it is DRM compliant, ie that it has been registered in the DG and not subsequently revoked. (Even though a device is not admitted to the domain unless it is compliant, it is still preferable to authenticate a device that requests a service, to check that the device requesting the service is still the same device that joined the domain and that the device has not been hacked since joining the domain.) Note that "device requesting service" will typically be a user-initiated action, e.g. by the user of the device pressing a button on the device or its remote control.

Step 2: If the device is authenticated successfully, the DG will retrieve a license, stored in the DG, for the content (if the DG does not have a license for the requested content, it will request one from the SDP—step 2A).

Step 3: The DG next checks the content usage policies specified in the license. Of importance to the invention is that the DG will also check if the license contains rules about the number of simultaneous devices (or type of device) that is allowed to render the content. We assume a maximum of N copies are allowed.

Step 4: The DG checks how many devices are currently using the content (i.e. how many sub-licenses it has already generated).

Step 5a: If, and only if, the number of devices are currently using the content is at most N−1, the DG will issue a new sublicense for the device and send the license to the device. The device can now render the content (step 6).

Step 5b: Alternatively, if N devices are currently using the content, the DG refuses the request for the content.

As mentioned above, the DG may use a counter to record the number of devices that are currently accessing content. Where a decrement counter is used, the counter may be decremented by one when a sublicense is issued at step 5a (step 7).

It can be seen from the above description that the present invention provides the following functionality:

From the point of view of the SDP, it provides full control of the distribution of DRM based material in the user domain. By this, is meant that the security policy stated by the SDP is enforced by the DG—the distribution of DRM material is still based on the security policy stated by the SDP for that material at the propagation time. The security policy is enforced through the creation of licenses in the DG and through a hierarchy of different types of (sub)licenses created.

It provides fully user-controlled domains. By this is meant that there are no restriction imposed by service providers (i.e. by the SDP or CP) on what type of device, or how many devices, can be in a domain, as long as the devices of a domain are compliant and thus the security policy stated by the SDP can be enforced. This is provided by the invention through:

Control by the DG of addition/removal of different devices to the home domain, in particular checking whether a device is compliant before it is added to a domain Restricted simultaneous access is provided through the DG registration (DG, SDP authentication), service activation (SID, M-SID authentication), and the delivery of master licenses to DG. These master licenses define the number of maximum simultaneous access to the content. The maximum number of access is enforced by DG through limiting the number of channels to be created (see FIG. 8).

Central trusted gateway model: The gateway in the invention is represented by DG. DG is in charge of distributing the content and sub-licenses to different devices 5 of a domain 4, which makes it possible to restrict simultaneous access to content by devices of the domain.

The invention thus provides a high level of protection for content, while still allowing the domain to be controlled by the domain users.

The present invention may, if desired, be implemented with one or more of the following additional features:

User-Added Content Access Restrictions

The subscribers (end-users) cannot use content outside the license restrictions applied by the SDP, but the users can further restrict access to content beyond the license restrictions applied by the SDP. This could for instance be useful to protect children from "adult content". To this end, each device may be associated with a profile. The profiles could be "adult", "child", "guest", "friend" etc, and the DG would then cross-check also the device profile before granting access right to content in response to a user request (e.g. before making keys available). This is shown as optional step 8 in FIG. 8. If a device having a "child" profile were to request "adult" content, for example, the DG would refuse the request even if the limit on the number of simultaneous users for that content had not been reached.

A device could belong to several profiles, in which case a password or similar is used to "unlock" the respective profiles so the device has a profile appropriate to the current user. For example a device in a shared room that may be used by many different users may belong to several profiles (whereas a device in a child's room may always be associated with a "child" profile).

A similar approach could also be used to assign certain users/devices in the domain certain "status". For example, a temporary visitor may be associated with a "guest" profile limiting his/her content usage. Guests, or "mobile users" can also be handled by means of M-SID, as will be described next.

The profiles may be defined by the domain manager or the DG manager.

Mobility of Subscriptions

To allow content access to be fully mobile (while a user is away from their normal location, e.g. is visiting a friend or staying in a hotel), the DG may be able to distinguish between "normal" SIDs and mobile SIDs. A M-SID is similar to a SID. For example, it can be based on a smart card, certificate or the like. What distinguishes it from a "normal" SID is that the SDP and DG can recognize it as being M-SID. This could be achieved by, for example, having a special format for the identifiers used in M-SID (e.g. "john.doe.M-SID4@sdp.com") and/or having a function in the network (e.g. at the SDP) that the DG can query about SIDs/M-STDs. For example, when a user A visits a friend's (B's) house, A may identify himself using a mobile SID and let it be handled by the DG of B's domain. User A can be allowed to create a (temporary) domain (or profile) to which also the B's local devices can be added. By using the mobile SID, A can enjoy his own subscription (or selected parts thereof) while in B's home, possibly "borrowing" B's big-screen TV to render the content. When A leaves, the temporary domain is blocked or destroyed. To enable this, the DG of B's domain is required to be able to handle more than one subscription, and to control access to content under the terms of more than one subscription—in this example, the DG of B's domain is required to be able to handle (temporarily) A's subscription in addition to B's subscription, and to control access to content under the terms of A's subscription (or parts thereof) as well as controlling access to content under the terms of B's subscription.

The SDP will of course require that A is charged for the services used while A is visiting B's domain. This requires that the M-SID of A interacts securely with (or is transferred to) B's DG. This may for example be made using Near-Field communication and setting up secure wireless connection to transfer A's M-SID to the DG. Alternatively, a suitable credential may be used to identify a subscription and the related service provider, with the credential being input into the DG via a suitable interface—for example, a physical secure token (such as a smart card) may be used to contain the M-SID and this would be inserted in a suitable interface (eg a smart card reader) provided in or operably connected to the DG.

An M-SID is thus a mobile SID, i.e. a SID which can be moved between different DGs (e.g., respectively, a smart card or a certificate signed by the SDP (or possibly the CP)), as long as they are able to identify the subscription in a secure way.

The use of one or more (M)SID depends on SDP business model; for example, the SDP can provide distinct services for home and foreign access, and use the SID to distinguish between them. Thus, home and foreign accesses can possibly have different policy.

The invention has been described above primarily in the context of IPTV, but the invention is not limited to use with IPTV content. The invention is equally applicable to distribution of other forms of content such as, for example, movies, music, general forms of audio, text, computer games or software, etc.

The invention has been described with reference to embodiments in which only the total number of devices accessing the content at one time is monitored by the Domain Gateway and is enforced by the Domain Gateway in accordance with the license for the content. The invention is not however limited to this, and it would be possible to apply the invention not only to monitor the total number of devices accessing the content at one time but also to monitor the numbers of different types of devices accessing the content. To enforce this, the Domain Gateway would monitor, separately, how many devices of each device type were currently accessing the content (for example by maintaining separate counters for each device type), and would decide whether to allow a request to access content received from a device in the domain on the basis of how many device of that device type were currently accessing the content.

A device "type" might, for example, relate to its compliance with copy protection requirements and enforcement of DRM usage rules. It would be possible to specify that, at any time, no more than N1 compliant device and N2 non-compliant (or partially-compliant) device were accessing the content (with N1>N2, preferably N1>>N2). To enforce this, the Domain Gateway would monitor, separately, how many devices of each type were currently accessing the content, for example by maintaining separate counters for compliant devices and non-compliant (or partially-compliant) devices. In this example, if N2 non-compliant (or partially-compliant) devices were currently accessing the content a request from a further non-compliant (or partially-compliant) device would be refused by the Domain Gateway, even if fewer than N1 compliant devices were currently accessing the content. This provides an alternative to simply refusing a request if the device making the request is deemed to be non-compliant (or only partially compliant).

A device "type" might alternatively relate to its manufacturer, for example if devices from one manufacturer (eg Ericsson) are believed to be more secure than devices from another manufacturer, then it would be possible to specify that at any time, no more than 1000 Ericsson devices and 5 devices from another manufacturer were accessing the content.

A device type might also, for example, relate to the particular model of the device, or to its date of manufacture (on the presumption that newer device are in general more secure than older devices).

The maximum number of each device type that might access content simultaneously might be set by the domain manager (but in such a way as not to exceed the maximum number of simultaneous accesses as defined by the SDP/CP in the content license). For example, if the content license allows up to 100 devices to access the content simultaneously, the domain manager might decide that no more than 98 compliant devices and 2 non-compliant (or partially-compliant) devices could access the content simultaneously. Alternatively, the content license might directly specify limits on the maximum number of each device type that might access content simultaneously as well as setting an overall limit on the number of devices that might access content simultaneously.

The invention claimed is:

1. A method of controlling access to content, the method comprising:
   receiving, at a domain gateway of a domain, a request from a device in the domain for access to content;
   determining at the domain gateway whether a number of devices in the domain currently accessing the content, or a number of devices of a particular type in the domain currently accessing the content, is less than a specified maximum number, the specified maximum number being independent of a number of devices in the domain;
   if the determination is that the number of devices in the domain currently accessing the content, or the number of devices of a particular type in the domain currently accessing the content, is less than the specified maximum number, allowing the request; and
   otherwise, refusing the request.

2. The method of claim 1, wherein the specified maximum number is specified in a license associated with said content and stored at the domain gateway.

3. The method of claim 2, wherein the license is received at the domain gateway in response to a subscription request sent by the domain gateway to a service provider.

4. The method of claim 2, wherein the license is received at the domain gateway in response to a request for a license to access the content sent by the domain gateway.

5. The method of claim 2, wherein the license received at the domain gateway does not specify a limit on the number of devices in the domain.

6. The method of claim 2, further comprising, if the request is allowed, granting and issuing a sub-license to the device.

7. The method of claim 6, wherein the sub-license allows the device to issue a sub-sub-license for access to the content.

8. The method of claim 6, wherein the sub-license is unlimited in term.

9. The method of claim 6, further comprising cancelling the sub-license when the device ceases accessing the content.

10. The method of claim 6, further comprising the domain gateway updating a record of the number of devices accessing the content.

11. The method of claim 6, wherein the sub-license allows the device access to real-time content distribution.

12. The method of claim 6, wherein the sub-license is a sub-license for stored or storable content.

13. The method of claim 2, wherein the license further specifies, for two or more device types, limits on numbers of each device type that are permitted to simultaneously access the content.

14. The method of claim 13, further comprising:
    upon receipt of the request; determining whether the number of devices of that device type in the domain currently accessing the content is less than the limit specified in the license for that device type; and
    if the determination is that the number of devices of that device type in the domain currently accessing the content is less than the limit specified in the license for that device type, allowing the request.

15. The method of claim 1, wherein the specified maximum number of devices in the domain that are permitted to simultaneously access the content is defined by a service provider.

16. The method of claim 1, further comprising determining, at the domain gateway, whether the device is DRM (Digital Rights Management) compliant, and rejecting the request if the device is not DRM compliant.

17. The method of claim 1, further comprising:
    receiving, at the domain gateway, a request to join the domain from a device not in the domain;
    determining whether the device is DRM (Digital Rights Management) compliant; and
    rejecting the request for the device to join the domain if the device is not DRM compliant.

18. The method of claim 1, further comprising:
    when the request is received at the domain gateway, determining whether the device satisfies a user-defined requirement; and
    rejecting the request if the device does not satisfy the user-defined requirement.

19. The method of claim 18, wherein determining whether the device from satisfies the user-defined requirement comprises checking a profile associated with the device.

20. The method of claim 1, further comprising:
    when the request is received at the domain gateway, determining whether the device satisfies a requirement defined by a service provider; and
    rejecting the request if the device does not satisfy the requirement defined by the service provider.

21. The method of claim 20, wherein determining whether the device from which the request is received satisfies the defined by a service provider comprises checking a profile associated with the device.

22. The method of claim 1, further comprising handling a plurality of subscriptions for access to content and controlling access to content in accordance with the subscriptions.

23. The method of claim 22, further comprising using a credential to identify one of the subscriptions towards a service provider.

24. A method of controlling access to content, the method comprising receiving, at a domain gateway of a domain, a license for content, the license specifying at least a maximum number of devices in the domain that are permitted to simultaneously access the content, the maximum number being independent of a number of devices in the domain.

25. A method as claimed in claim 24, further comprising:
    receiving at the gateway a request from a device in the domain for access to the content;
    determining whether a number of devices in the domain currently accessing the content is less than the maximum number of devices specified in the license;
    if the determination is that the number of devices in the domain currently accessing the content is less than the maximum number of devices specified in the license, allowing the request; and
    otherwise, rejecting the request.

26. The method of claim 24, wherein the license received at the domain gateway does not specify a limit on the number of devices in the domain.

27. The method of claim 24, wherein the license further specifies, for two or more device types, limits on numbers of each device type that are permitted to simultaneously access the content.

28. The method of claim 24, wherein the maximum number of devices in the domain that are permitted to simultaneously access the content is defined by a service provider.

29. The method of claim 24, further comprising handling a plurality of subscriptions for access to content and controlling access to content in accordance with the subscriptions.

30. The method of claim 29, further comprising using a credential to identify one of the subscriptions towards a service provider.

31. A method of controlling access to content, the method comprising providing a domain gateway of a domain with a license for content, the license specifying a maximum number of devices in the domain that are permitted to simultaneously access the content, the maximum number being independent of a number of devices in the domain.

32. The method of claim 31, further comprising delegating, to the domain gateway, enforcement of the control of the maximum number of devices in the domain that are permitted to simultaneously access the content.

33. The method of claim 31, wherein the license further specifies, for two or more device types, limits on numbers of each device type that are permitted to simultaneously access the content.

34. The method of claim 31, further comprising handling a plurality of subscriptions for access to content and controlling access to content in accordance with the subscriptions.

35. The method of claim 34, further comprising using a credential to identify one of the subscriptions towards a service provider.

36. A gateway for controlling access to content, the gateway configured to:
receive a request from a device in a domain associated with the gateway for access to the content;
determine whether a number of devices in the domain currently accessing the content, or a number of devices of a particular type in the domain currently accessing the content, is less than a specified maximum number, the specified maximum number being independent of a number of devices in the domain;
if the determination is that the number of devices in the domain currently accessing the content, or the number of devices of a particular type in the domain currently accessing the content, is less than the specified maximum number, allow the request; and
otherwise, reject the request.

37. The gateway of claim 36, further configured to handle a plurality of subscriptions for access to content and to control access to content in accordance with the subscriptions.

38. The gateway of claim 36, comprising an interface configured to receive a credential identifying one of the subscriptions towards a service provider.

39. The gateway of claim 38, wherein said credential is a smart-card and said interface is a smart-card reader.

40. A gateway for controlling access to content, the gateway configured to:
store a license for accessing content, the license specifying a maximum number of devices in a domain associated with the gateway that are permitted to simultaneously access the content, the maximum number being independent of a number of devices in the domain; and
monitor a number of devices in the domain accessing the content.

41. The gateway of claim 40, further configured to handle a plurality of subscriptions for access to content and to control access to content in accordance with the subscriptions.

42. The gateway of claim 41, comprising an interface configured to receive a credential identifying one of the subscriptions towards a service provider.

43. The gateway of claim 42, wherein said credential is a smart-card and said interface is a smart-card reader.

* * * * *

UNITED STATES PATENT AND TRADEMARK OFFICE
CERTIFICATE OF CORRECTION

PATENT NO. : 8,578,506 B2
APPLICATION NO. : 13/122687
DATED : November 5, 2013
INVENTOR(S) : Näslund et al.

It is certified that error appears in the above-identified patent and that said Letters Patent is hereby corrected as shown below:

On the title page, in item (12) and item (75), under "Inventors", in Column 1, Line 1, delete "Mats Naslund," and insert -- Mats Näslund, --, therefor.

On the title page, item (75), under "Inventors", in Column 1, Line 3, delete "SãPaulo (BR); and insert -- São Paulo (BR); --, therefor.

In the Specification

In Column 3, Line 7, delete "SOP." and insert -- SDP. --, therefor.

In Column 6, Line 65, delete "subscriptions/STDs" and insert -- subscriptions/SIDs --, therefor.

In Column 11, Line 24, delete ""Physical license" 12," and insert -- "Physical license" 13, --, therefor.

In Column 11, Line 24, delete ""Play license" 13" and insert -- "Play license" 14 --, therefor.

In Column 11, Line 25, delete ""Stream license" 14" and insert -- "Stream license" 15" --, therefor.

In Column 15, Line 41, delete "SIDs/M-STDs." and insert -- SIDs/M-SIDs. --, therefor.

Signed and Sealed this
Fifteenth Day of July, 2014

Michelle K. Lee
*Deputy Director of the United States Patent and Trademark Office*